(12) United States Patent
Kawahara et al.

(10) Patent No.: US 10,821,520 B2
(45) Date of Patent: Nov. 3, 2020

(54) PRODUCTION METHOD FOR IMPELLER

(71) Applicant: MITSUBISHI HEAVY INDUSTRIES COMPRESSOR CORPORATION, Tokyo (JP)

(72) Inventors: Kosei Kawahara, Hiroshima (JP); Akihiko Morikawa, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 16/481,256

(22) PCT Filed: Feb. 24, 2017

(86) PCT No.: PCT/JP2017/007241
§ 371 (c)(1),
(2) Date: Jul. 26, 2019

(87) PCT Pub. No.: WO2018/154737
PCT Pub. Date: Aug. 30, 2018

(65) Prior Publication Data
US 2019/0388972 A1    Dec. 26, 2019

(51) Int. Cl.
*B22F 3/105*     (2006.01)
*B22F 3/24*      (2006.01)
(Continued)

(52) U.S. Cl.
CPC .............. *B22F 3/16* (2013.01); *B22F 3/1055* (2013.01); *B22F 3/15* (2013.01); *B22F 3/24* (2013.01);
(Continued)

(58) Field of Classification Search
CPC .. B22F 3/16; B22F 3/1055; B22F 3/15; B22F 3/24; B22F 5/00; B22F 2003/1058;
(Continued)

(56) References Cited

U.S. PATENT DOCUMENTS

2015/0044048 A1    2/2015  Ahn
2016/0243620 A1*   8/2016  Butcher ................ B23P 15/006
(Continued)

FOREIGN PATENT DOCUMENTS

CN           106077643 A     11/2016
EP             3028793 A1     6/2016
(Continued)

OTHER PUBLICATIONS

I. Gibson, D.W. Rosen, and B. Stucker, Additive Manufacturing . . . Technologies, DOI 10.1007/978-1-4419-1120-9_1, Springer Science+Business Media, LLC 2010 (Gibson). (Year: 2010).*
(Continued)

*Primary Examiner* — Jessee R Roe
*Assistant Examiner* — Rebecca Janssen
(74) *Attorney, Agent, or Firm* — Osha Liang LLP

(57) ABSTRACT

A production method for an impeller includes: an impeller molding body forming step of forming an impeller molding body in which a reinforcement portion which reinforces at least one of end portions of the impeller in which an inlet and an outlet of a flow path are formed and the impeller are integrated with each other, by an additive manufacturing method using a metal powder; and a removal step of removing the reinforcement portion from the impeller molding body.

4 Claims, 4 Drawing Sheets

(51) Int. Cl.
  *B22F 5/00* (2006.01)
  *F04D 29/28* (2006.01)
  *B33Y 10/00* (2015.01)
  *B22F 3/16* (2006.01)
  *B22F 3/15* (2006.01)

(52) U.S. Cl.
  CPC .............. *B22F 5/00* (2013.01); *F04D 29/284* (2013.01); *B22F 2003/1058* (2013.01); *B22F 2003/247* (2013.01); *B22F 2201/11* (2013.01); *B33Y 10/00* (2014.12); *F05B 2230/22* (2013.01)

(58) Field of Classification Search
  CPC ............ B22F 2003/247; B22F 2201/11; B22F 2998/10; B22F 5/009; F05B 2230/22; F05D 2230/20; B33Y 80/00; B33Y 10/00; B33Y 40/00; F04D 29/28; F04D 29/284; F04D 29/023
  See application file for complete search history.

(56) References Cited

U.S. PATENT DOCUMENTS

| | | | |
|---|---|---|---|
| 2017/0232670 A1* | 8/2017 | Joerger | B33Y 40/00 264/497 |
| 2017/0259329 A1 | 9/2017 | Felwor | |
| 2018/0051709 A1* | 2/2018 | Pulnikov | B22F 3/1055 |
| 2018/0154441 A1* | 6/2018 | Miller | B22F 3/1055 |

FOREIGN PATENT DOCUMENTS

| | | |
|---|---|---|
| JP | 2016-037901 A | 3/2016 |
| JP | 2017-36484 A | 2/2017 |
| WO | 2015/088852 A1 | 6/2015 |
| WO | 2016-127225 A1 | 8/2016 |

OTHER PUBLICATIONS

Decision to Grant in corresponding Japanese Application No. 2017-563268, dated Dec. 22, 2017 (5 pages).

International Search Report and Written Opinion in corresponding International Application No. PCT/JP2017/007241, dated May 23, 2017 (11 pages).

* cited by examiner

PRODUCTION METHOD FOR IMPELLER

TECHNICAL FIELD

The present invention relates to a production method for an impeller.

BACKGROUND ART

For example, an impeller used in a rotary machine such as a centrifugal compressor includes a disk, a blade, and a cover. The disk is fixed to a rotary shaft provided in the rotary machine. A plurality of the blades are provided on a surface of the disk with gaps therebetween in a circumferential direction. The cover covers the blades from a side opposite to the disk. In the impeller, a portion between the disk, cover, and the blades adjacent to each other in the circumferential direction is a flow path through which a fluid flows.

For example, PTL 1 describes a method of forming an impeller by an additive manufacturing method. In the additive manufacturing method, a metal powder which is disposed to match a shape of a desired impeller is sintered by thermal energy generated by laser, an electron beam, or the like. Steps of disposing and sintering the metal powder are sequentially repeated, and thus, the sintered metal powders are laminated, and an impeller having a desired shape is formed.

CITATION LIST

Patent Literature

[PTL 1] Japanese Unexamined Patent Application, First Publication No. 2016-37901

SUMMARY OF INVENTION

Technical Problem

Meanwhile, in an impeller, an end portion in which an inlet or an outlet of a flow path of a disk or a cover is formed is thin. Accordingly, there is a possibility that the end portion of the impeller may be deformed in a process in which metal powders are laminated.

The present invention provides a production method for an impeller capable of limiting a deformation of the end portion of the impeller to perform molding with high accuracy while forming the entire impeller by an additive manufacturing method.

Solution to Problem

According to a first aspect of the present invention, there is provided a production method for an impeller which includes a disk which has a disk shape about an axis, a plurality of blades which are formed on a surface facing a first side in an axial direction of the disk with gaps therebetween in a circumferential direction about the axis, and a cover which covers the plurality of blades from the first side in the axial direction and in which a flow path is formed between the disk, the cover, and the blades, the production method including: an impeller molding body forming step of forming an impeller molding body in which a reinforcement portion which reinforces at least one of end portions of the impeller in which an inlet and an outlet of the flow path are formed and the impeller are integrated with each other, by an additive manufacturing method using a metal powder; and a removal step of removing the reinforcement portion from the impeller molding body.

According to this configuration, when the impeller is formed by the additive manufacturing method, the reinforcement portion is integrally formed with the impeller, and thus, the end portion of the impeller is reinforced. Accordingly, the end portion of the impeller is prevented from being deformed at the time of the impeller molding body forming step. The reinforcement portion is removed from the impeller molding body after the impeller molding body forming step, and thus, it is possible to form the impeller having a desired shape.

In the production method for an impeller according to a second aspect of the present invention, in the first aspect, the reinforcement portion may be integrally formed with at least one of the disk and the cover.

According to this configuration, in a case where at least one of the disk and the cover is thin, at least one can be reinforced by the reinforcement portion.

In the production method for an impeller according to a third aspect of the present invention, in the first or second aspect, the reinforcement portion may be formed at a position at which the reinforcement portion closes the flow path in the end portion of the impeller and may include a communication hole which allows the flow path to communicate with an outside.

According to this configuration, it is possible to reliably reinforce a portion having a particularly low strength of the end portion of the impeller in which the inlet or the outlet of the flow path is formed. In addition, prior to the step of removing the reinforcement portion from the impeller molding body, it is possible to remove the unmelted metal powder, which remains in the flow path, through the communication hole by air blowing or the like.

In the production method for an impeller according to a fourth aspect of the present invention, in any one of the first to third aspects, in the impeller molding body forming step, the impeller molding body may be formed such that inner peripheral surfaces of the inlet and the outlet of the flow path are inclined with respect to a vertical direction and a horizontal direction.

According to this configuration, the impeller molding body is formed in a state of being inclined according to the shape of the formed impeller, and thus, it is possible to favorably form a shape of the entire impeller including a shape in the flow path by the additive manufacturing method.

In the production method for an impeller according to a fifth aspect of the present invention, in any one of the first to fourth aspects, in the impeller molding body forming step, a support portion which has a tubular shape and supports an outer peripheral portion of the impeller molding body may be integrally formed with the reinforcement portion According to this configuration, a radially outer-side end portion of the impeller which is easily deformed is supported, and thus, it is possible to prevent a deformation of the radially outer-side end portion with high accuracy.

Advantageous Effects of Invention

According to the present invention, it is possible to limit the deformation of the end portion of the impeller to perform the molding with high accuracy while forming the entire impeller by the additive manufacturing method.

DESCRIPTION OF EMBODIMENTS

Figure 1:
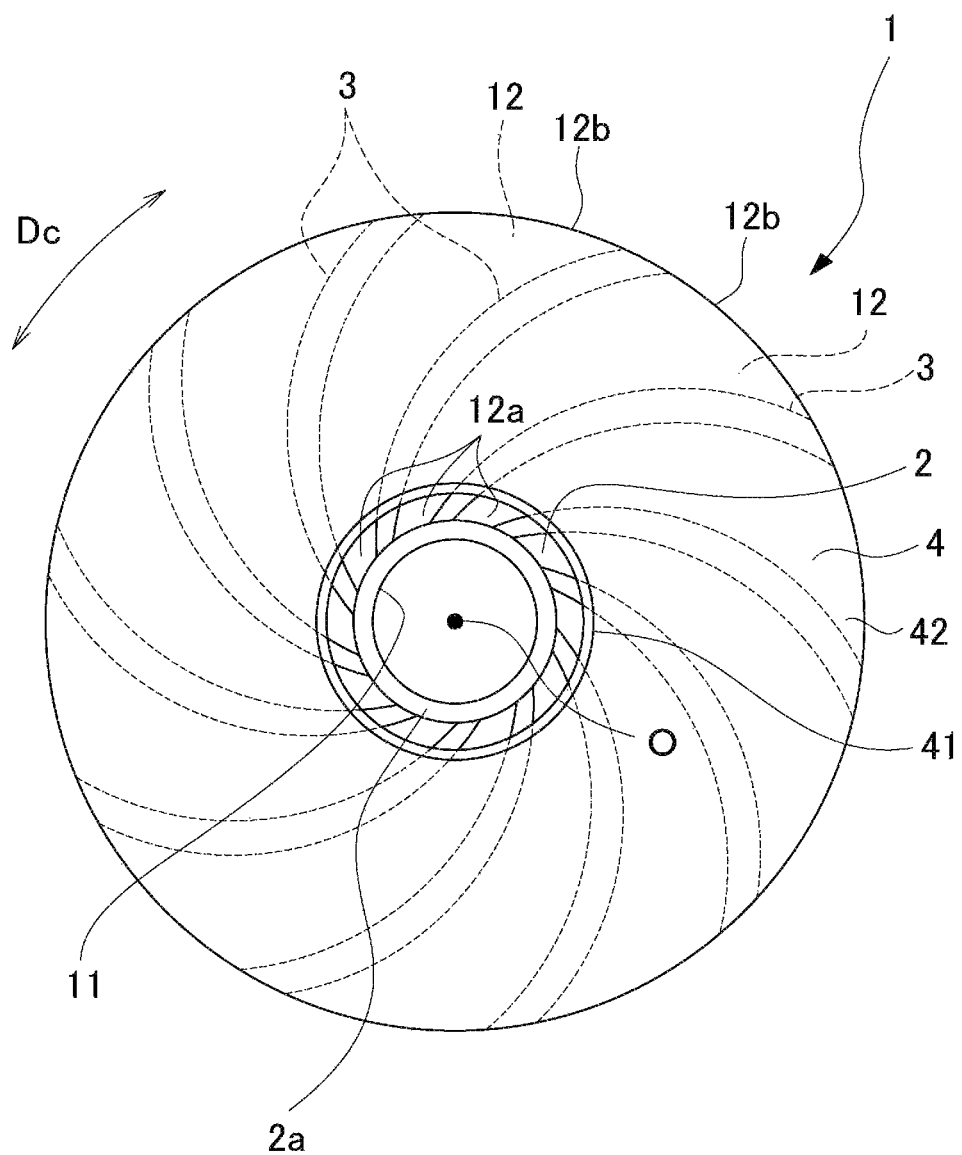
FIG. 1 is a view when an impeller manufactured by a production method for an impeller in an embodiment of the present invention is viewed in an axial direction of the impeller.
Figure 2:
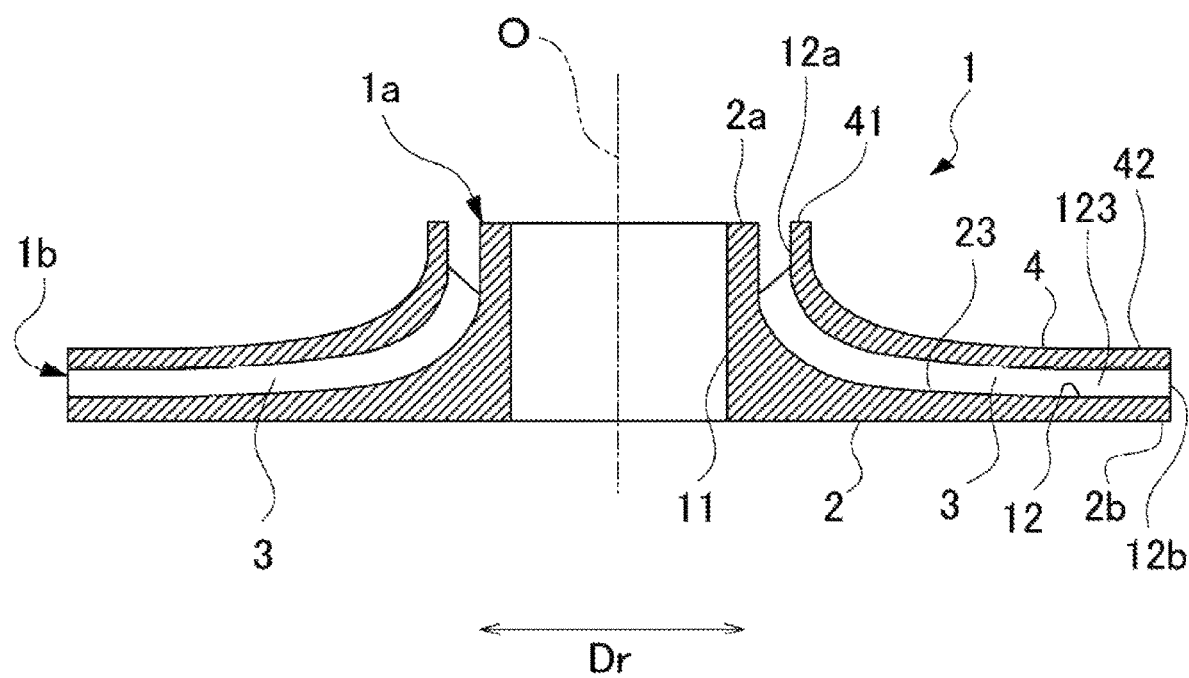
FIG. 2 is a sectional view when the impeller shown in FIG. 1 is taken along an axis of the impeller.
Figure 3:
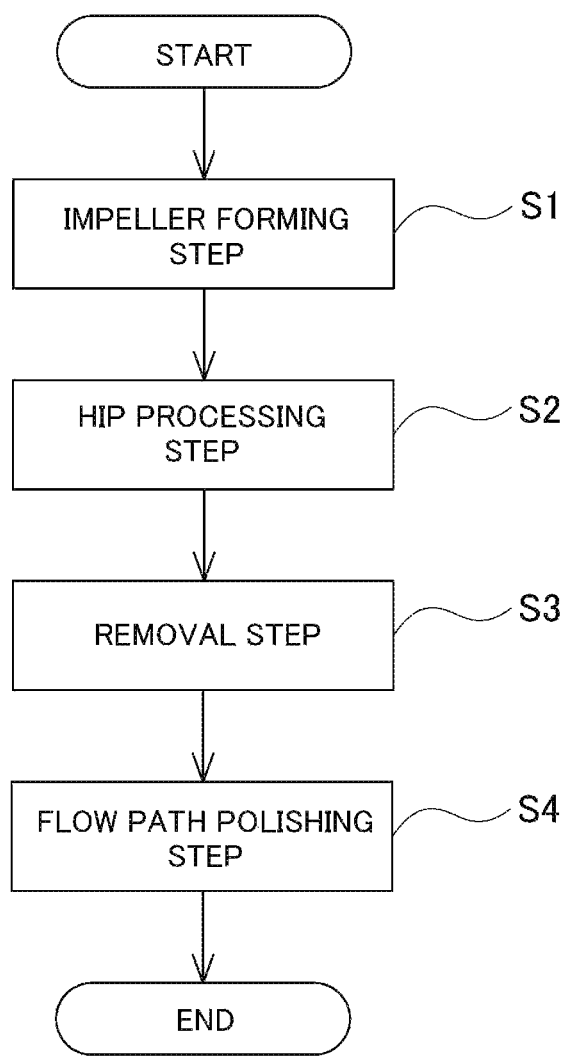
FIG. 3 is a flowchart showing a flow of the production method for an impeller in the embodiment of the present invention.
Figure 4:
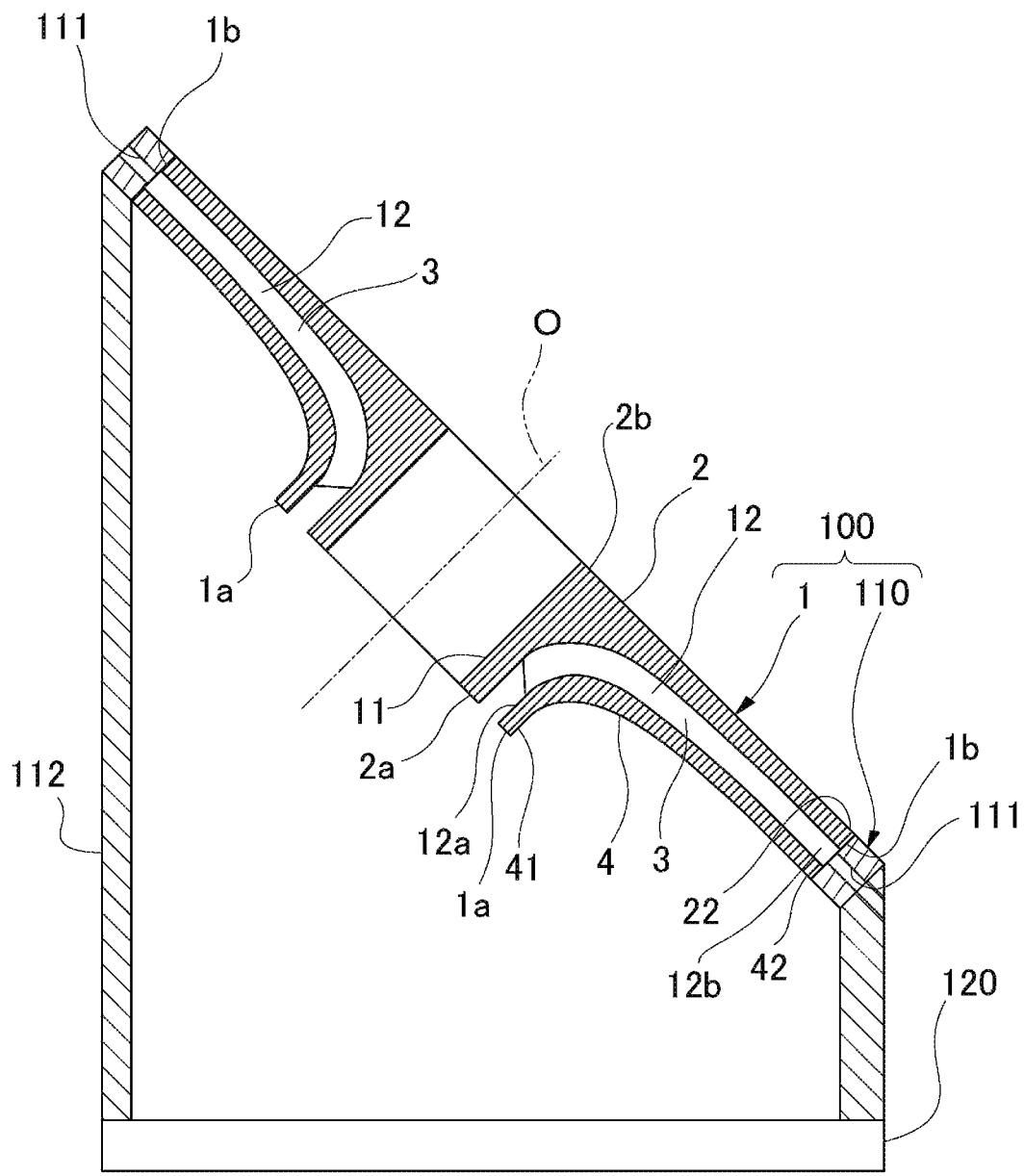
FIG. 4 is a sectional view when an impeller molding body formed by the production method for an impeller in the embodiment of the present invention is taken along the axis of the impeller.

Hereinafter, a production method for an impeller and an impeller molding body of the present invention will be described with reference to the drawings. FIG. 1 is a view when an impeller manufactured by a production method for an impeller in an embodiment of the present invention is viewed in an axial direction of the impeller. FIG. 2 is a sectional view when the impeller shown in FIG. 1 is taken along an axis of the impeller. FIG. 3 is a flowchart showing a flow of the production method for an impeller in the embodiment of the present invention. FIG. 4 is a sectional view when an impeller molding body formed by the production method for an impeller in the embodiment of the present invention is taken along the axis of the impeller.

For example, an impeller produced according to the present embodiment is mounted on a rotary machine such as a centrifugal compressor. As shown in FIGS. 1 and 2, the impeller 1 includes a disk 2, blades 3, and a cover 4.

The disk 2 has an approximately circular shape when viewed in an axis O direction in which the axis O extends. The disk 2 is formed in a disk shape about the axis O. More specifically, the disk 2 is formed such that dimensions of the disk 2 in radial direction Dr about the axis O gradually increase from an end portion 2a on a first side (upper side in FIG. 2) in the axis O direction toward an end portion 2b on a second side (lower side in FIG. 2). The disk 2 has a curved surface 23, which is curved to be recessed toward the second side (end portion 2b side) in the axis O direction, as a surface facing the first side (end portion 2a side) in the axis O direction.

Moreover, a shaft insertion hole 11 which penetrates the disk 2 in the axis O direction is provided at a center of the disk 2. A rotary shaft (not shown) of the rotary machine is inserted into the shaft insertion hole 11 in the axis O direction. Accordingly, the impeller 1 can be integrally rotated with the rotary shaft of the rotary machine.

The blades 3 are formed to be erected from the curved surface 23 of the disk 2 toward the first side in the axis O direction. The plurality of blades 3 are formed on the curved surface 23 with gaps therebetween in a circumferential direction Dc about the axis O. Each blade extends to be separated from the disk 2 and is formed to extend from an inner side (shaft insertion hole 11 side) of the disk 2 in the radial direction Dr toward an outer side thereof.

The cover 4 is provided at interval in the axis O direction with respect to the curved surface 23 of the disk 2. The cover 4 is provided to cover the plurality of blades 3 from the first side in the axis O direction. The cover 4 has a disk shape about the axis O. Specifically, the cover 4 has an umbrella shape in which a diameter gradually decreases from the second side in the axis O direction toward the first side. An inner peripheral end portion 41 of the cover 4 is disposed with a gap in the radial direction Dr between the inner peripheral end portion 41 and the end portion 2a of the disk 2. Accordingly, a portion between the inner peripheral end portion 41 of the cover 4 and the end portion 2a of the disk 2 is open toward the first side in the axis O direction. In addition, the cover 4 is disposed with a gap in the axis O direction between the cover 4 and the end portion 2b of the disk 2. Accordingly, a portion between an outer peripheral end portion 42 of the cover 4 and the end portion 2b of the disk 2 is open toward the outside in the radial direction Dr.

Flow paths 12 are formed inside the impeller 1 by the disk 2, the cover 4, and the blades 3. Each flow path 12 is defined by the blades 3 adjacent to each other in the circumferential direction Dc between the disk 2 and the cover 4. The impeller 1 has the plurality of flow paths 12 in the circumferential direction Dc. Each flow path 12 has a flow path inlet 12a which is open toward the first side in the axis O direction between the end portion 2a of the disk 2 and the inner peripheral end portion 41 of the cover 4. In addition, each flow path 12 has a flow path outlet 12b which is open toward the outside in the radial direction Dr between the end portion 2b of the disk 2 and the outer peripheral end portion 42 of the cover 4. In the impeller 1, an end portion in which the flow path inlet 12a is formed is referred to as an inlet-side end portion 1a. Moreover, in the impeller 1, an end portion in which the flow path outlet 12b is formed is referred to as an outlet-side end portion 1b. Moreover, an inner peripheral surface 123 of the flow path 12 is constituted by the curved surface 23 of the disk 2, the surface of the cover 4 facing the second side in the axis O direction, and the surface of the blade 3 facing the circumferential direction.

A gap between the disk 2 and the cover 4 is formed to be gradually narrowed from the inside in the radial direction Dr toward the outside. In addition, a gap (hereinafter, this gap is referred to as a flow path width) in the circumferential direction Dc between the blades 3 adjacent to each other in the circumferential direction DC is formed to be gradually widened from the flow path inlet 12a toward the flow path outlet 12b. Each flow path 12 is formed such that a flow path cross-sectional area thereof gradually decreases from the flow path inlet 12a toward the flow path outlet 12b.

Next, a manufacturing method of the impeller 1 will be described.

As shown in FIG. 3, the manufacturing method of the impeller 1 in the present embodiment includes an impeller molding body forming step S1, an HIP processing step S2, a removal step S3, and a flow path polishing step S4.

In the impeller molding body forming step S1, an impeller molding body 100 shown in FIG. 4 is formed by an additive manufacturing method using a metal powder. In the impeller molding body 100, a reinforcement portion 110 which reinforces at least one of the inlet-side end portion 1a and the outlet-side end portion 1b and the impeller 1 are integrally formed with each other.

The reinforcement portion 110 of the present embodiment is formed at the outlet-side end portion 1b. That is, the reinforcement portion 110 is formed outside the impeller 1 in the radial direction Dr. The reinforcement portion 110 is formed at a position at which the reinforcement portion 110 closes the flow path 12 by the outlet-side end portion 1b. The reinforcement portion 110 is integrated with the end portion 2b of the disk 2 and the outer peripheral end portion 42 of the cover 4 and is formed in an annular shape which is continuous in the circumferential direction Dc. The reinforcement portion 110 is formed to have the same thickness as that of the outlet-side end portion 1*b* of the impeller 1 to connect the end portion 2*b* of the disk 2 and the outer peripheral end portion 42 of the cover 4 to each other.

Moreover, in the reinforcement portion 110, a communication hole 111 which allows the flow path 12 to communicate with the outside is formed. The communication hole 111 penetrates the reinforcement portion 110 and communicates with each flow path 12.

In the impeller molding body forming step S1, the reinforcement portion 110 and the impeller 1 are integrally formed with each other by the additive manufacturing method using the metal powder. In the impeller molding body forming step S1 of the present embodiment, a predetermined metal powder forming the impeller 1 is disposed on a base plate 120, and the metal powder is irradiated with thermal energy such as laser or an electron beam according to a desired sectional shape of the impeller molding body 100. In this case, the impeller molding body 100 is molded to have a posture in which the axis O of the impeller 1 is inclined with respect to a vertical direction and a horizontal direction. Specifically, the impeller molding body 100 is molded such that the inner peripheral surface 123 of the flow path inlet 12*a* and the flow path outlet 12*b* is inclined at a predetermined angle in the vertical direction and the horizontal direction. Here, the predetermined angle is an angle at which a support portion is not required in the flow path 12 in the additive manufacturing method and a shape of the inner peripheral surface 123 of the flow path 12 can be molded. Accordingly, a support portion 112 which supports an outer portion of the impeller molding body 100 is molded along with the impeller molding body 100 such that the impeller molding body 100 can be inclined at the predetermined angle and can be supported.

The support portion 112 is formed in a tubular shape and supports an outer peripheral portion of the impeller molding body 100 from below. The support portion 112 is formed on the base plate 120 prepared in advance along with the impeller molding body 100 by the additive manufacturing method. The support portion 112 is formed to extend upward from the base plate 120. The support portion 112 of the present embodiment is integrally formed with the reinforcement portion 110.

In the impeller molding body forming step S1, the metal powder is irradiated with the thermal energy, and thus, the metal powder is sintered. Thereafter, the metal powder is disposed again and is irradiated with the thermal energy. In this way, by sequentially repeating the disposition of the metal powder and the irradiation of the thermal energy, the impeller molding body 100 having a desired shape is laminated integrally with the support portion 112.

Moreover, when the impeller molding body 100 is formed, the support portion for supporting the impeller molding body 100 by the base plate 120 may be appropriately formed at a place except for the place shown in FIG. 4.

After the impeller molding body 100 and the support portion 112 are formed on the base plate 120 by the above-described powder additive manufacturing method, the base plate 120 and the impeller molding body 100 are cut off from each other by wire cutting or the like. In this case, it is preferable that most of the support portion 112 is cut off from the impeller molding body 100.

Thereafter, prior to the HIP processing step S2, the metal powder which remains to be unmelted when the molding is performed in the impeller molding body forming step S1 is removed. With respect to this, preferably, air is injected to the impeller molding body 100 by an air blowing device such that the remaining metal powder is blown away. If the air is injected from the flow path inlet 12*a* side to each flow path 12 by the air blowing device, the metal powder remaining in the flow path 12 can be removed toward the outside through the communication hole 111. In addition, the air is injected from the flow path outlet 12*b* side to the flow path 12 through communication hole 111, and thus, the metal powder can be removed from the flow path inlet 12*a*.

Thereafter, the HIP processing step S2 is performed. In the HIP processing step S2, the impeller molding body 100 formed in the impeller molding body forming step S1 is processed by a hot isostatic pressing (HIP). In the HIP processing step S2, the laminated impeller molding body 100 is accommodated in a pressure container (not shown) filled with an inert gas such as argon and is pressurized at a predetermined temperature. Accordingly, an isotropic pressure is applied to the impeller molding body 100 using the inert gas as a pressure medium. Voids generated in the impeller molding body 100 formed in the impeller molding body forming step S1 are crimped by the hot isostatic pressing.

In addition, the HIP processing step S2 may be performed on the impeller molding body 100 in which the support portion 112 is not cut off from the impeller molding body 100.

In the removal step S3, the reinforcement portion 110 is removed from the impeller molding body 100. In the present embodiment, the removal step S3 is performed after the HIP processing step S2. In the removal step S3, the reinforcement portion 110 is removed from the impeller molding body 100 processed by the hot isostatic pressing, by an appropriate method such as wire cutting. Accordingly, the impeller 1 is obtained.

In the flow path polishing step S4, a polishing fluid containing abrasive grains flows through the flow paths of the impeller 1 after the removal step S3 while being pressurized, and thus, fluid polishing is performed on the impeller 1. Specifically, in the flow path polishing step S4, the polishing fluid is moved while being pressurized from the flow path inlet 12*a* toward the flow path outlet 12*b*. Accordingly, the inner peripheral surface 123 of each flow path 12 is polished, and a predetermined surface roughness is obtained.

Moreover, the flow path polishing step S4 is not limited to the polishing fluid being pressurized from the flow path inlet 12*a* toward the flow path outlet 12*b*. For example, in the flow path polishing step S4, the polishing fluid may be pressurized from the flow path outlet 12*b* toward the flow path inlet 12*a* so as to reciprocate the polishing fluid in the flow path 12.

Here, in a state before the polishing, compared to a case where the impeller 1 is formed by machining such as cutting, in the inner peripheral surface 123 of the flow path 12 of the impeller 1 formed by the additive manufacturing method, not only the entire surface roughness increases but also a variation in the surface roughness for each region increases. Accordingly, for example, if polishing such as electropolishing or chemical polishing is performed on the inner peripheral surface 123 having a large variation in the surface roughness, efficiency decreases, and it is difficult to uniformly remove irregularities of the surface of the inner peripheral surface 123. Meanwhile, since the fluid polishing is used, the irregularities of the inner peripheral surface 123 of the flow path 12 of the impeller 1 formed by the additive manufacturing method are effectively and uniformly removed, and a desired surface roughness for the entire inner peripheral surface 123 is obtained.

According to the production method for an impeller of the above-described embodiment, when the impeller 1 is formed by the additive manufacturing method, the reinforcement portion 110 is integrally formed with the impeller 1, and thus, the outlet-side end portion 1b of the impeller 1 is reinforced. Accordingly, the outlet-side end portion 1b of the impeller 1 is prevented from being deformed at the time of the impeller molding body forming step S1. In addition, the reinforcement portion 110 is removed from the impeller molding body 100 after the impeller molding body forming step S1, and thus, it is possible to form the impeller 1 having a desired shape. In this way, it is possible to prevent the deformation of the end portion of the impeller 1 to perform the molding with high accuracy while forming the entire impeller 1 by the additive manufacturing method.

In addition, the reinforcement portion 110 is provided outside the impeller 1 in the radial direction Dr and is integrally formed with the disk 2 and the cover 4. According to this configuration, in a case where the disk 2 and the cover 4 are thin, the disk 2 and the cover 4 can be reinforced by the reinforcement portion 110. Accordingly, the deformations of the disk 2 and the cover 4 are limited.

In addition, the reinforcement portion 110 is provided outside the impeller 1 in the radial direction Dr to close the flow path outlet 12b. Accordingly, the outlet-side end portion 1b, in which the flow path outlet 12b is formed and the disk 2 or the cover 4 is thin, is reinforced. Accordingly, it is possible to reliably reinforce a portion having particularly low strength.

In addition, the reinforcement portion 110 has the communication hole 111 which communicates with the flow path 12. According to this configuration, it is possible to remove the unmelted metal powder, which remains in the flow path 12, through the communication hole 111 by air blowing or the like. Accordingly, prior to a thermal processing of the impeller molding body 100, it is possible to effectively remove the remaining metal powder.

Moreover, in the step of forming the impeller molding body 100 by the additive manufacturing method, the impeller molding body 100 is formed in a state of being inclined, and thus, it is possible to favorably form a shape of the entire impeller 1 including a shape in the flow path 12 by the additive manufacturing method.

In addition, the impeller molding body 100 is formed while the outer peripheral portion of the impeller molding body 100 is supported by the tubular support portion 112. According to this configuration, the entire periphery of the impeller molding body 100 can be supported in a state of being inclined while the impeller molding body 100 is formed by the additive manufacturing method. Accordingly, the entire periphery of a radially outer-side end portion of the impeller 1 which is easily deformed is supported, and thus, it is possible to favorably form the entire impeller 1 by the additive manufacturing method while preventing a deformation of the radially outer-side end portion.

Hereinbefore, the embodiment of the present invention is described in detail with reference to the drawings. However, the respective configurations and combinations thereof in the embodiment are merely examples, and additions, omissions, substitutions, and other modifications of configurations are possible within a scope which does not depart from the gist of the present invention. In addition, the present invention is not limited by the embodiment, and is limited only by the claims.

For example, the shape, the material, or the like of the impeller 1 is not particularly limited.

Moreover, in the present embodiment, the reinforcement portion 110 is integrally formed with both the disk 2 and the cover 4. However, the reinforcement portion 110 is not limited to this structure. The reinforcement portion 110 may be integrally formed with at least one of the disk 2 and the cover 4.

INDUSTRIAL APPLICABILITY

According to the above-described production method for an impeller, it is possible to limit a deformation of a portion of the impeller to perform the molding with high accuracy while forming the entire impeller by the additive manufacturing method.

REFERENCE SIGNS LIST

1: impeller
2: disk
2a, 2b: end portion
3: blade
4: cover
11: shaft insertion hole
12: flow path
12a: flow path inlet
12b: flow path outlet
23: curved surface (first surface)
41: inner peripheral end portion
42: outer peripheral end portion
100: impeller molding body
110: reinforcement portion
111: communication hole
112: support portion
120: base plate
Dc: circumferential direction
Dr: radial direction
O: axis
S1: impeller molding body forming step
S2: HIP processing step
S3: removal step
S4: flow path polishing step

What is claimed is:

1. A production method for an impeller which includes a disk which has a disk shape about an axis, a plurality of blades which are formed on a surface facing a first side in an axial direction of the disk with gaps therebetween in a circumferential direction about the axis, and a cover which covers the plurality of blades from the first side in the axial direction and in which a flow path is formed between the disk, the cover, and the blades, the production method comprising:

forming an impeller molding body in which a reinforcement portion which reinforces an end portion of the impeller in which an inlet and an outlet of the flow path are formed and the impeller are integrated with each other, by an additive manufacturing method using a metal powder;

removing metal powder remaining in the flow path; and removing the reinforcement portion from the impeller molding body, wherein when forming the impeller molding body, the impeller molding body is formed such that inner peripheral surfaces of the inlet and the outlet of the flow path are inclined with respect to a vertical direction and a horizontal direction, the reinforcement portion closes the flow path in the end portion and at an outside of the impeller so as to connect the disk and the cover to each other, the reinforcement portion includes a communication hole which allows the flow path to communicate with the outside, and when removing the metal powder, air is injected into the impeller molding body to remove the metal powder remaining in the flow path to the outside through the communication hole.

2. The production method for an impeller according to claim 1, wherein the reinforcement portion is integrally formed with at least one of the disk and the cover.

3. The production method for an impeller according to claim 1, wherein when forming the impeller molding body, a support portion which has a tubular shape and supports an outer peripheral portion of the impeller molding body is integrally formed with the reinforcement portion.

4. The production method for an impeller according to claim 2, wherein when forming the impeller molding body, a support portion which has a tubular shape and supports an outer peripheral portion of the impeller molding body is integrally formed with the reinforcement portion.

* * * * *